(12) United States Patent
Andreani et al.

(10) Patent No.: US 8,361,221 B2
(45) Date of Patent: Jan. 29, 2013

(54) ADDITIVE FOR REDUCING CHROMIUM (VI) TO CHROMIUM (III) IONS

(75) Inventors: Pierre-Antoine Andreani, Etampes (FR); Bruno Pellerin, Avon (FR); Karen Ayme, Pithiviers (FR)

(73) Assignee: Chryso (FR)

( * ) Notice: Subject to any disclaimer, the term of this patent is extended or adjusted under 35 U.S.C. 154(b) by 566 days.

(21) Appl. No.: 12/498,231

(22) Filed: Jul. 6, 2009

(65) Prior Publication Data

US 2009/0266272 A1 Oct. 29, 2009

Related U.S. Application Data

(62) Division of application No. 11/279,974, filed on Apr. 17, 2006, now abandoned.

(30) Foreign Application Priority Data

Apr. 18, 2005 (FR) ...................................... 05 03855

(51) Int. Cl.
*C04B 24/04* (2006.01)
(52) U.S. Cl. ........................................ 106/728; 106/733
(58) Field of Classification Search .................. 106/713, 106/724, 728, 733
See application file for complete search history.

(56) References Cited

U.S. PATENT DOCUMENTS

| | | | | |
|---|---|---|---|---|
| 3,607,352 A * | 9/1971 | Fadgen et al. | ................. | 427/306 |
| 5,487,906 A * | 1/1996 | Dixit et al. | ................. | 424/673 |
| 7,087,110 B2 * | 8/2006 | Jardine et al. | ................. | 106/713 |
| 7,128,782 B2 * | 10/2006 | Jardine et al. | ................. | 106/730 |
| 7,232,483 B2 * | 6/2007 | Jardine et al. | ................. | 106/819 |
| 7,922,811 B2 * | 4/2011 | Jardine et al. | ................. | 106/823 |
| 2006/0272554 A1 * | 12/2006 | Jardine et al. | ................. | 106/823 |
| 2007/0034118 A1 * | 2/2007 | Jardine et al. | ................. | 106/693 |

FOREIGN PATENT DOCUMENTS

| | | |
|---|---|---|
| DE | 299 15 326 | 7/2000 |
| DE | 20 2004 010467 | 9/2004 |
| EP | 0 960 865 | 12/1999 |
| GB | 976742 | 12/1964 |
| WO | WO 2005/016843 | 2/2005 |

OTHER PUBLICATIONS

STN Chem. Abstract, AN 128:273201 CA, Ping et al., Immersion plating of bronze, *Metal Finishing*, 95(11): 54, 56-57 (1997).
STN Chem. Abstract, CN 1052337, Wu (1991).
STN Chem. Abstract, DE 202004010467, MIG Material Germany (2004).
STN Chem. Abstract, DE 19755185, Macht (1999).
STN Chem. Abstract, JP 51039542, Kamiyama et al. (1976).
STN Chem. Abstract, JP 52130446, Asada et al. (1977).
STN Chem. Abstract, JP 52151643, Shibata et al. (1977).
STN Chem. Abstract, JP 62248596, Ogura et al. (1987).
STN Chem. Abstract, JP 03277790, Akama et al. (1991).
STN Chem. Abstract, JP 2001192886, Kato (2001).
STN Chem. Abstract, KR 9705207, Kim (1997).
STN Chem. Abstract, SU 561751, Stepanenko et al. (1977).

* cited by examiner

*Primary Examiner* — Paul Marcantoni
(74) *Attorney, Agent, or Firm* — Barnes & Thornburg LLP

(57) ABSTRACT

The invention relates to an additive for reducing Cr(VI) ions to Cr(III) ions, comprising a complex of tin(II) and a carboxylic acid or a salt thereof, and to the process for the preparation thereof. It also relates to a process for preparing a material having a low chromium(VI) content. Finally, it relates to the use of said additive for reducing chromium(VI) ions to chromium(III) ions.

11 Claims, 1 Drawing Sheet

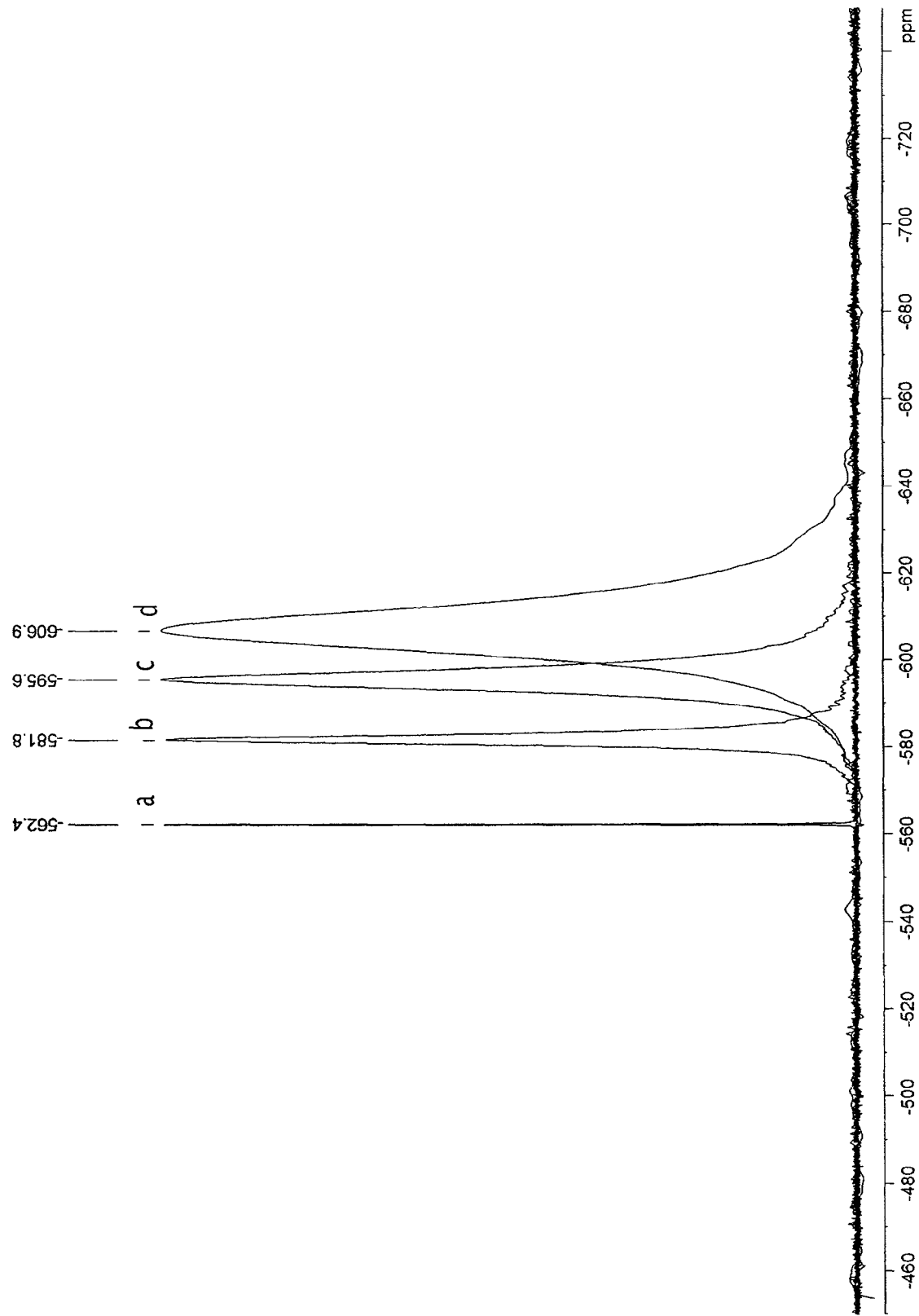

ADDITIVE FOR REDUCING CHROMIUM (VI) TO CHROMIUM (III) IONS

CROSS-REFERENCE TO RELATED PATENT APPLICATIONS

This application is a Divisional of copending U.S. patent application Ser. No. 11/279,974, filed Apr. 17, 2006, which claims priority to French application no. 0503855, filed Apr. 18, 2005, all of which applications are expressly incorporated herein by reference in their entireties.

TECHNICAL FIELD OF THE INVENTION

The invention relates to an additive for reducing Cr(VI) ions to Cr(III) ions, which is particularly useful for reducing the chromium(VI) content of cementing media (hydraulic binders), and to a process for the preparation thereof.

BACKGROUND OF THE INVENTION

Water-soluble chromium(VI) may cause irritation or allergic reactions when placed in contact with the skin, and is classified by the European Union as a carcinogenic substance. Exposure to it should therefore be kept to a minimum. European Directive 2003/53/EC of 18 Jun. 2003 therefore prescribes for cements a chromium(VI) content of less than 2 ppm.

Additives are known which allow cement to be treated to reduce chromium(VI). Compositions containing Fe(II) sulphate as an agent for reducing chromium(VI) may be used to this end. However, Fe(II) is unstable in aqueous solution, so these additives have to be used in powder form. A precise dosage of powders is awkward and requires specific equipment. Moreover, these additives rapidly lose their capacity to reduce chromium(VI) ions, owing to oxidation of the Fe(II) ions on contact with air. The efficacy of these additives is therefore reduced if they are stored for a long time.

In a highly basic medium (pH≧13), such as in the interstitial medium of cement, tin(II) reacts with the hydroxide ions of the medium so as to form the $Sn(OH)_4^{2-}$ ion according to Equation 1.

$$Sn^{2+} + 4OH^- \rightarrow Sn(OH)_4^{2-} \quad \text{Equation 1}$$

The $Sn(OH)_4^{2-}$ ion is able to reduce $CrO_4^{2-}$ to $Cr(OH)_{3-}$ by the oxidation/reduction reaction of Equation 2.

$$2CrO_4^{2-} + 8H_2O + 3Sn(OH)_4^{2-} \rightarrow 2Cr(OH)_3 + 4OH^- + 3Sn(OH)_6^{2-} \quad \text{Equation 2}$$

It will be recalled that the redox potentials of the pairs used during the reaction are as follows:

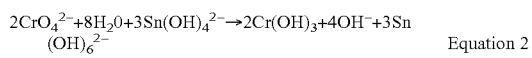

Thus, a colloidal suspension of tin(II) hydroxide stabilized by a stabilizing agent and optionally by a thickener is known from WO 2005/016843.

The tin(II) ions tend to oxidise to tin(IV), thus reducing the efficacy of the additive. Furthermore, the solubility of the salts of tin(II) ions is satisfactory only at very acidic pHs. Now, solutions having a pH of less than 2 are considered to be corrosive, and the use thereof requires expensive suitable equipment.

Besides, an agent for reducing Cr(VI) ions in hydraulic compositions comprising tin(II) ions, in synergistic association with a lignosulphonic acid, is known from EP 0960 865.

SUMMARY OF THE INVENTION

One aim of the present invention was therefore to propose an additive for reducing Cr(VI) ions to Cr(III) ions, in the form of a solution that is stable in storage and that has a capacity to reduce Cr(VI) ions which remains substantially constant for a long time. The term "stability" herein refers, primarily, to the absence of precipitation, even at a pH of greater than 2.

Another aim of the present invention was to propose a non-corrosive additive of this type having a pH of greater than 2.

Another aim of the present invention was to propose an additive of this type in which the tin(II) is stable (no precipitation) even in an alkaline medium.

Another aim of the present invention was to propose an additive of this type that does not modify the properties and the behavior of the added materials.

Another aim of the present invention was to propose an additive of this type allowing the chromium(VI) content of the added materials to be reduced to a value of less than 2 ppm.

Finally, another aim of the present invention was to propose an additive of this type that is economical to use and produce.

These and other objects are achieved by the present invention, which, according to a first aspect, relates to an additive for reducing Cr(VI) ions to Cr(III) ions, comprising an aqueous solution of a complex of tin(II) and a carboxylic acid or a salt thereof.

Advantageously, the additive is in the form of a clear (limpid) aqueous solution.

DESCRIPTION OF PREFERRED EMBODIMENTS

According to the invention, the complexing agent of the tin(II) is a carboxylic acid or a salt thereof. The carboxylic acid is preferably selected from hydroxylated carboxylic acids, such as gluconic acid, tartaric acid, citric acid and the salts thereof. Particularly preferred are the salts of gluconic acid, especially sodium gluconate. Other compounds capable of releasing carboxylate ions in solution may, of course, also be used.

The concentration of tin(II) complex in the additive may vary widely. In practice, the concentration is controlled in order to limit the supply of water, without leading to an excessively high viscosity. Conventionally, the concentration will be between 1 and 30, preferably between 5 and 25% (expressed in % by weight of tin).

Preferably, the additive may also comprise a pH-adjusting agent such as, for example, sodium hydroxide. In order to prevent excessive modification of the properties and the behavior of the materials treated, the pH-adjusting agent is preferably selected from the additives conventionally used in the preparation of these materials. Thus, for the treatment of cements, the pH-adjusting agent may thus be especially selected from the alkanolamines, especially triethanolamine and triisopropanolamine.

Finally, the additive described may also contain other additives conventional for the desired application, especially for the preparation of the cementing medium such as cement, for example grinding agents, resistance-activating agents or airentraining agents.

Especially, the additive may also comprise an antioxidant agent in order to further extend its stability in storage. This antioxidant may advantageously be selected from the family of the trappers of free radicals such as, for example, hydroquinone and the derivatives thereof, propyl gallate, 2(3)t-butyl-4-hydroxyanisole, 2,6-di-tert-butyl-p-cresol, ethyl vanillin, rosemary oil, lecithin or vitamin E.

According to a second aspect, the invention relates to a process for preparing the additive described above, which includes the steps of bringing a tin(II) salt into contact with carboxylic acid or a salt thereof in the presence of an appropriate amount of water.

The molar ratio of carboxylic acid to tin(II) compound is preferably from 0.5:1 to 5:1. Although the structure of the tin(II)/carboxylic acid complex formed is not specified, it will be noted that the stability of the solution (clear solution without precipitation) at low temperature and at alkaline pH is particularly high for a ratio higher than from 1.5:1 to 2:1. This stability is maintained for higher ratios.

The type of tin(II) compound used is of no particular incidence. In practice, it will be selected from water-soluble tin(II) salts, such as tin(II) chloride, tin sulphate, tin fluoride and tin acetate.

The reaction between the tin(II) compound and the carboxylic acid or its salt is rapid and complete. The order in which the reagents are introduced is of no particular incidence. The reaction leads to the formation of a water-soluble complex, which is stable both in an acidic medium and in an alkaline medium (up to pH=14). The tin(II) thus complexed is stable with respect to oxidation, but available for an oxidation/reduction reaction with chromium(VI).

The additive described is particularly useful for producing materials having a low chromium(VI) content.

According to another aspect, the invention relates to a process for preparing a material having a low chromium(VI) content, including the step of bringing the material into contact with an appropriate amount of additive as described. The term "low chromium(VI) content" intends especially to refer to a water-soluble chromium(VI) content of less than 2 ppm.

Cementing medium-type materials (hydraulic binder-type materials) are especially intended. The term "cementing medium" (or "hydraulic binder") especially refers to cements, but also to calcium sulphate and its hydrated forms, fly ash and slag.

The use of the additive as described especially allows the preparation of cements having a content of less than 2 ppm and therefore meeting the requirements set by the aforementioned European Directive 2003/53/EC.

Finally, according to a last aspect, the invention relates to the use of the additive described for the preparation of a material having a low chromium(VI) content.

The admixing is carried out during the step in which the cement is prepared at the cement works. It consists in introducing the additive, after the step in which the clinker is obtained, during the preparation of the cement.

According to a preferred embodiment, the additive is used, within the cement preparation process, during grinding.

The proportions will advantageously be determined as a function of the water-soluble chromium(VI) ion content of the sampled material.

BRIEF DESCRIPTION OF THE DRAWINGS

A better understanding of the invention will be facilitated by the examples, given by way of illustration but without entailing limitation, and by the attached FIGURE, wherein:

The single FIGURE shows the chemical displacement in NMR$^{119}$Sn of:
(a) a 25% by weight SnCl$_2$ solution;
(b) a solution prepared according to Example 7;
(c) a solution prepared according to Example 8; and
(d) a solution prepared according to Example 9.

EXAMPLES

Unless otherwise indicated, the specified percentages are percentages by mass of the type in question, i.e. tin chloride (SnCl$_2$) or sodium gluconate.

Example 1

29.32 g of water then 25 g of dihydrated SnCl$_2$ were introduced into a suitable container, equipped with a stirrer, then stirred at ambient temperature until they had completely dissolved. 45.68 g of sodium gluconate were then added while continuing to stir. A clear, slightly yellow solution having a pH of 2.5 was obtained.

Examples 2 to 9

Example I was repeated, but the amounts of tin chloride and sodium gluconate were modified to the amounts indicated in Table 1.

The appearance of the additives prepared in Examples 1 to 9 was evaluated at ambient temperature, then after cold storage (0° C.) for 24 hours. The results are summarized in Table 1 (below).

It will be noted that the solution of Example 6 is highly viscous and has a sediment. It is assumed to be a supersaturated solution.

The solutions in Examples 7, 8 and 9 were studied by NMR$^{119}$Sn (FIGS. 1 (b), (c) and (d)) and compared with a 25% by weight SnCl$_2$ solution (FIG. 1 (a)).

The NMR tin tests were carried out at 300 K on a Bruker Avance 300 spectrometer (1 11.9 MHz for tin 119) equipped with a 5 mm BBI probe.

The solutions were studied without dilution or the addition of a lock solvent, the resonance width being considerably greater than the stability of the magnetic field (~2 Hz). The pulse sequence consisted of a single pulse of 30°, followed by the acquisition of the free precession signal at 16 k points. The pulse interval is 0.244 seconds and corresponds to the acquisition time.

This NMR data demonstrates the formation of complexes between gluconate and tin(II). The chemical displacement of tin in the absence of gluconate (spectrum a)—562 ppm—is very different from that of tin in the presence of gluconate (spectra b, c, d), in which spectra the chemical displacement is greater than—580 ppm. This clear difference in chemical displacement is unequivocal proof of the complexing of tin by gluconate.

TABLE 1

| Examples | Tin (% of SnCl$_2$) | Sodium gluconate (%) | Gluconate/ tin molar ratio | Appearance | Appearance at 0° C. |
|---|---|---|---|---|---|
| 1 | 15 | 13.76 | 1:1 | Milky | Precipitated |
| 2 | 15 | 20.64 | 1.5:1 | Milky | Precipitated |
| 3 | 15 | 27.52 | 2:1 | Clear | Clear |
| 4 | 30 | 27.52 | 1:1 | Clear | Precipitated |
| 5 | 30 | 41.28 | 1.5:1 | Clear | Clear |
| 6 | 30 | 55.04 | 2:1 | Sediment, viscous | Sediment, viscous |
| 7 | 25 | 22.84 | 1:1 | Slight haze | Precipitated |
| 8 | 25 | 34.28 | 1.5:1 | Clear | Clear |
| 9 | 25 | 45.68 | 2:1 | Clear | Clear |

It will be noted that the solutions prepared with a gluconate/tin molar ratio of 1.5:1 and 2:1 are clear at ambient temperature and do not precipitate, even after prolonged storage at 0° C. As far as the concentration is concerned, it will be noted that the solutions prepared with an amount of $SnCl_2$ between 15 and 25% are stable for a gluconate/tin molar ratio of 2:1, while the solutions prepared with an $SnCl_2$ amount of 25% are clear after storage at 0° C., even for a molar ratio of 1.5:1.

In order to explain the notion of clearness of the solutions, turbidity measurements were taken, using a TUB 550 IR turbidity meter, (WTW), from the solutions prepared in Examples 1, 3, 7, 8 and 9. The results are summarized in Table 2 (below).

TABLE 2

| Examples | Tin (°/O of SnClz) | Sodium gluconate (%) | Gluconate/ tin molar ratio | Appearance | Turbidity |
|---|---|---|---|---|---|
| 1 | 15 | 13.76 | 1:1 | Milky | 1004 |
| 3 | 15 | 27.52 | 2:1 | Clear | 3.7 |
| 7 | 25 | 22.84 | 1:1 | Slight haze | 42.5 |
| 8 | 25 | 34.28 | 1.5:1 | Clear | 6.2 |
| 9 | 25 | 45.68 | 2:1 | Clear | 6.3 |

The turbidity measurement clearly reveals the difference between a clear solution (low turbidity) and a milky solution (high turbidity).

A turbidity measurement taken after 24 hours (measured value 927) in Example 7 demonstrates the appearance of a precipitate. The solutions prepared in Examples 3, 8 and 9 remain at the same level of turbidity even after prolonged storage (for longer than 1 month). This would seem to indicate that there is a turbidity threshold, below which the turbidity of the solution remains low over a prolonged storage time.

a) Tests of the Reduction of Chromium(VI) in Cements

The solutions prepared in Examples 1 to 9 were used, as they were, to treat a cement having a soluble chromium(VI) content varying, in the individual batches, between 3.5 ppm and 5 ppm.

The cement was treated by addition to the cement at the inlet of the grinder.

The quantity of additive is indicated in ppm of solution relative to ppm of chromium(VI) present in the cement, as determined by prior analysis.

The chromium(VI) of the cement thus treated was subsequently determined immediately, then after ageing in a bag for 1 month, in accordance with Standard EN 196-10, which specifies the protocol for the analysis of chromium(VI) in cements.

The results are summarized in Table 3 (below).

TABLE 3

| Examples | Tin (°/O SnCl2) | Gluconate/ tin molar ratio | Dose of solution [ppm] | Cr(VI) T = 0 [ppm] | Cr(VI) T = 1 month [ppm] |
|---|---|---|---|---|---|
| 1 | 15 | 1:1 | 400 | 0.3 | 0.2 |
|   |    |     | 300 | 0.3 | 0.3 |
| 2 | 15 | 1.5:1 | 400 | 0.2 | 0.2 |
|   |    |     | 300 | 0.3 | 0.2 |
| 3 | 15 | 2:1 | 400 | 0.2 | <0.1 |
|   |    |     | 300 | 0.2 | 0.2 |
| 4 | 30 | 1:1 | 200 | 0.2 | 0.2 |
|   |    |     | 150 | 0.3 | 0.4 |
| 5 | 30 | 1.5:1 | 200 | 0.2 | 0.1 |

TABLE 3-continued

| Examples | Tin (°/O SnCl2) | Gluconate/ tin molar ratio | Dose of solution [ppm] | Cr(VI) T = 0 [ppm] | Cr(VI) T = 1 month [ppm] |
|---|---|---|---|---|---|
|   |    |     | 150 | 0.2 | 0.2 |
| 6 | 30 | 2:1 | tba | tba | tba |
| 7 | 25 | 1:1 | 240 | 0.2 | 0.2 |
|   |    |     | 180 | 0.3 | 0.3 |
| 8 | 25 | 1.5:1 | 240 | 0.2 | 0.1 |
|   |    |     | 180 | 0.3 | 0.3 |
| 9 | 25 | 2:1 | 240 | 0.2 | <0.1 |
|   |    |     | 180 | 0.3 | 0.3 |

It will be noted that all of the solutions tested allowed the chromium(VI) content to be reduced to a value of less than 0.5 ppm, i.e. well below the regulatory threshold applicable to cements under the above-mentioned Directive. These results are maintained over time, the values recorded after 1 month being constant, apart from reproducibility errors.

b) pH Stability of the Additives

The pH stability of the solutions prepared was assessed as follows.

A sample was taken from each of the solutions prepared in Examples 7, 8 and 9, then introduced into an appropriate container equipped with a stirrer and a pH-measuring probe. An NaOH solution was added dropwise to each of the solutions, at ambient temperature and while stirring, to establish in succession a pH of 5, 7, 9, 11 and 13.5. Once the pH had stabilised, the appearance of the solutions was assessed visually. The results are summarised in Table 4 (below). Even after they have been stored for a plurality of weeks, the solutions having a pH of 13.5 in Examples 8 and 9 are still clear.

TABLE 4

| pH | Example 7 | Example 8 | Example 9 |
|---|---|---|---|
| 2.5 | Clear | Clear | Clear |
| 5 | Slightly precipitated | Clear | Clear |
| 7 | Slightly precipitated | Clear | Clear |
| 9 | Precipitated | Clear | Clear |
| 11 | Precipitated | Clear | Clear |
| 13.5 | Paste | Clear | Clear |

These tests demonstrate that the additives prepared with a gluconate/tin molar ratio of greater than 1:1 are stable, i.e. clear, even at alkaline pHs. It is assumed that the precipitate in the solution in Example 7 originates from tin(II) present in non-complexed form, owing to the absence of gluconate in this solution.

The stability of the complex imparts a very considerable degree of formulation freedom, facilitating, in particular, compatibility with a broad range of additives. It may also help to stabilise the additive in materials having a very alkaline pH such as, in particular, cement, thus allowing the reductive effect of the chromium(VI) ions to be perpetuated. Finally, the stability of the additives provides them with a certain robustness with respect to variations in the processing conditions.

The invention claimed is:

1. A process for decreasing the chromium (VI) content of a hydraulic binder, the process including the step of contacting the hydraulic binder with an effective amount of an additive comprising an aqueous solution of a tin(II) complex formed between tin(II) ions and a carboxylic acid or a salt thereof to reduce Cr(VI) ions to Cr(III) ions.

2. The process of claim 1, wherein the additive is in the form of an aqueous solution.

3. The process of claim 1, wherein the carboxylic acid is gluconic acid.

4. The process of claim 1, wherein the additive further comprises a pH-adjusting agent.

5. The process of claim 4, wherein said pH-adjusting agent is an alkanolamine.

6. The process of claim 4, wherein the pH-adjusting agent is sodium hydroxide.

7. The process of claim 1, wherein the additive further comprises an antioxidant agent selected from the group consisting of hydroquinone and derivatives thereof, propyl gallate, t-butyl-4-hydroxyanisole, 2,6-di-tert-butyl-p-cresol, ethyl vanillin, rosemary oil, lecithin and vitamin E.

8. A process for preparing the additive of claim 1, the process including the step of contacting a tin(II) salt with the carboxylic acid or the salt thereof in the presence of water.

9. The process of claim 8, wherein the molar ratio of the carboxylic acid or the salt thereof to tin(II) salt is from 0.5:1 to 5:1.

10. The process of claim 8, wherein the tin(II) salt is selected from the group consisting of tin chloride, tin sulphate, tin fluoride and tin acetate.

11. The process of claim 1, wherein the hydraulic binder is selected from the group consisting of cements, calcium sulphate and hydrated forms thereof, fly ash, and slag.

* * * * *